(No Model.) 3 Sheets—Sheet 2.
L. BECKER.
FERTILIZER DISTRIBUTER FOR GRAIN DRILLS.
No. 303,973. Patented Aug. 26, 1884.
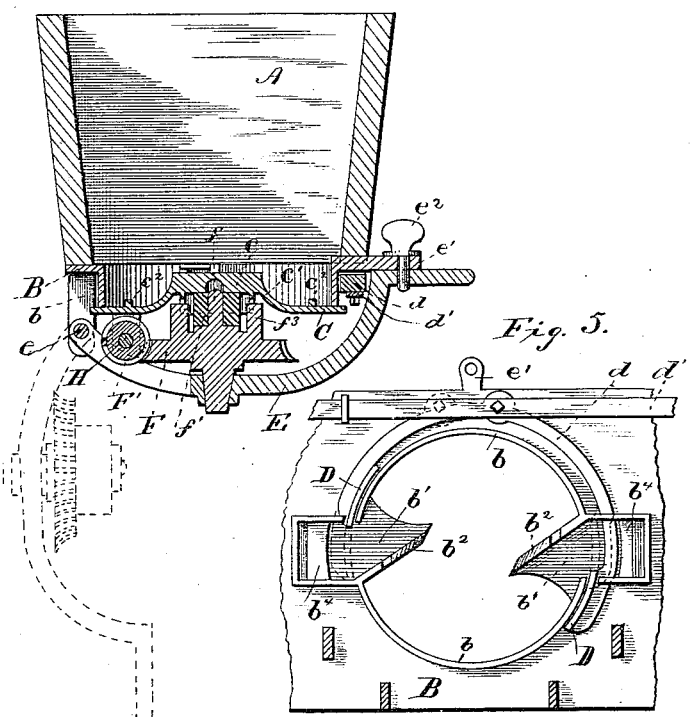
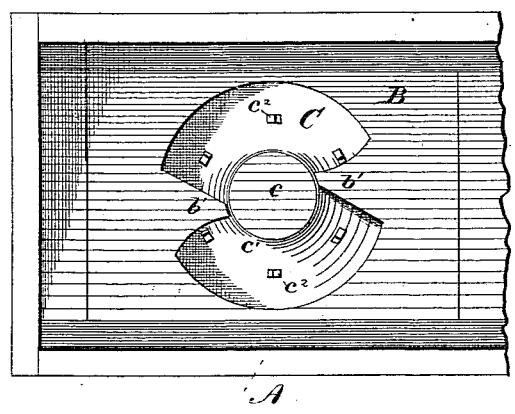
WITNESSES
Chas. R. Burr
Fred F. Church
INVENTOR
Leander Becker
by Church & Church
His Attorneys (No Model.)   3 Sheets—Sheet 3.
L. BECKER.
FERTILIZER DISTRIBUTER FOR GRAIN DRILLS.
No. 303,973.   Patented Aug. 26, 1884.
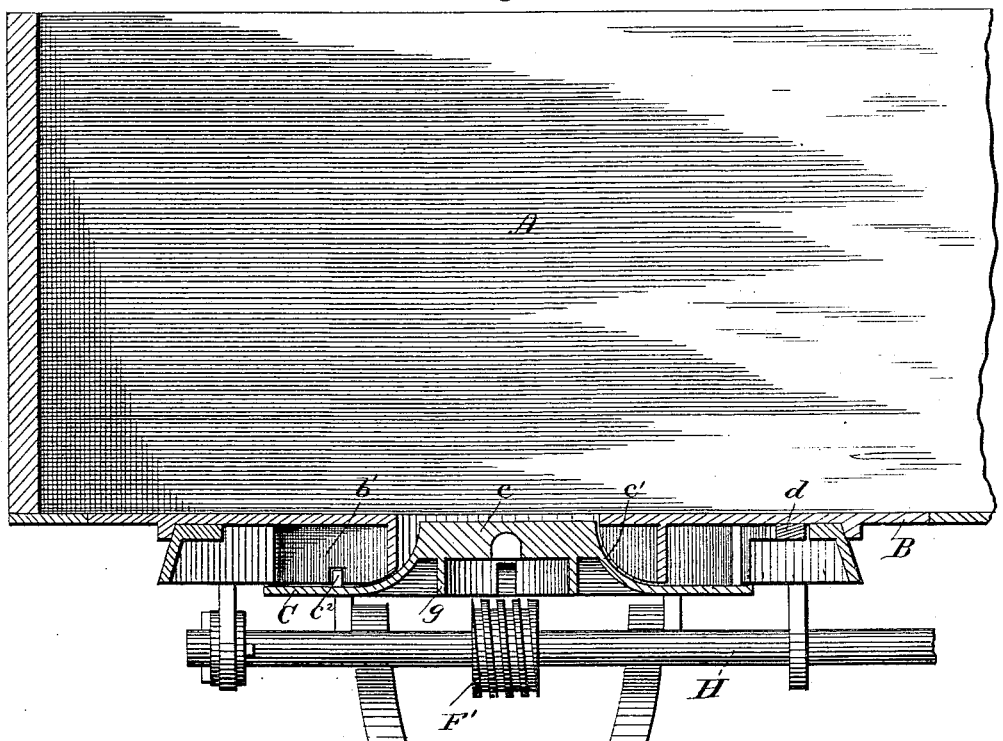
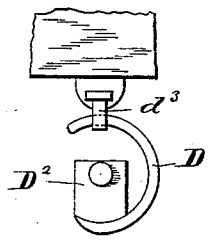
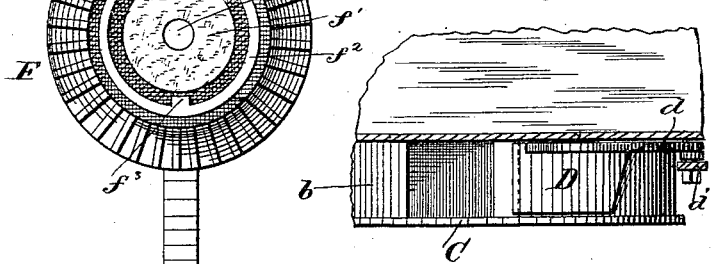
WITNESSES
Chas. R. Burr
Fred F. Church
INVENTOR
Leander Becker
by Church & Church
His Attorney

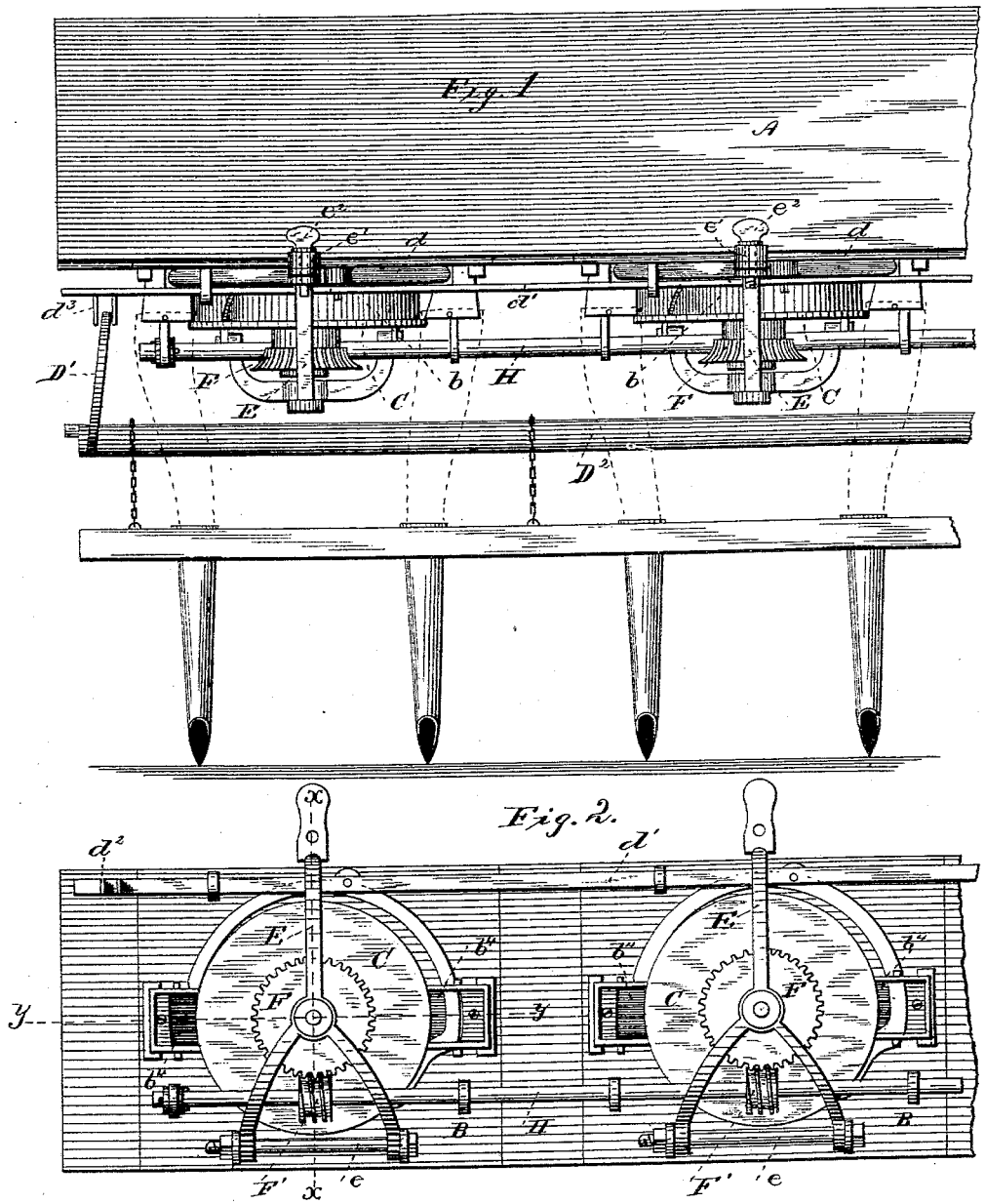

UNITED STATES PATENT OFFICE.

LEANDER BECKER, OF YORK, PENNSYLVANIA.

FERTILIZER-DISTRIBUTER FOR GRAIN-DRILLS.

SPECIFICATION forming part of Letters Patent No. 303,973, dated August 26, 1884.

Application filed May 13, 1884. (No model.)

*To all whom it may concern:*

Be it known that I, LEANDER BECKER, of York, in the county of York and State of Pennsylvania, have invented certain new and useful Improvements in Fertilizer-Distributers for Grain-Drills; and I do hereby declare the following to be a full, clear, and exact description of the same, reference being had to the accompanying drawings, forming a part of this specification, and to the figures and letters of reference marked thereon.

My present invention relates to that class of fertilizer-distributers usually employed in connection with seed-drills or corn-planters; and it consists in the several combinations, constructions, and arrangements of parts, as hereinafter fully described, and pointed out in the claims.

In the accompanying drawings, Figure 1 is a rear view of my improved attachment as applied to a seed-drill; Fig. 2, a bottom plan view; Fig. 3, a transverse section on the line $x\,x$, Fig. 2; Fig. 4, a top, and Fig. 5 a bottom, view of the plate of frame to which the feed-disk is applied; Fig. 6, a section on the line $y\,y$, Fig. 2, with the sustaining and adjusting lever swung downward. Figs. 7 and 8 are details of the cut-off and its operating mechanism.

Similar letters of reference in the several figures indicate like parts.

The box or hopper A, of any ordinary well-known construction, has bolted or otherwise secured to it the frame or plate B. This plate is provided with a dependent concentric flange, $b$, projecting through and below the bottom of the hopper, and with one or more inwardly-projecting cups or conduits, $b'$, open at the bottom and one side, and provided with a scraper or flange, $b^2$, at the other side.

Beneath the plate B, and fitting snugly against its flange $b$, is the rotary feed-disk C, upon which the material rests and is carried into and delivered through the conduits $b'$. The disk C is preferably constructed with a raised central portion, $c$, to direct the material toward and upon the flanges $c'$, and the flange $b^2$ of the conduit is made to conform to the surface of the disk with which it co-operates. The disk is also preferably provided with studs or projections $c^2$, and the flange $b^2$ with a notch or opening for their passage, whereby the material resting upon the disk is kept in motion and prevented from clogging or caking. The disk, when set in motion, carries the material resting upon its surface into or under the projecting conduit, and the flange $b^2$, being set tangential to the axis of motion, diverts the material into the openings $b^4$, from whence it passes through the boots of the seeder.

In order to stop or limit the discharge from the conduit, I have arranged a cut-off or sliding gate, D, adapted to close the passage-way between the conduit and opening $b^4$. Said cut-off is attached to a bar, $d$, supported in suitable guides, and pivoted to a bar or rod, $d'$, extending the length of the hopper. Projecting between two pins or rollers, $d^2$, attached to said rod $d'$, is an inclined sector or cam, D', mounted upon the rotating shaft D², through the movements of which the drills are elevated, the several parts being so connected and arranged that when the drills are elevated the gate will be closed and the feed stopped so long as the drills remain elevated or inactive.

In using a disk-feed of the kind above described great difficulty is experienced in maintaining a tight joint between the disk and the plate or casing, owing to the rapid wear of the parts, the disk soon getting loose, which not only interferes with its operation, but allows the fertilizer to escape at the sides or edges. In order to overcome or in a great measure obviate these difficulties, I have mounted the disk and its operating-gear upon an adjustable arm or support, E. The support E is bifurcated at one end, and pivoted upon a rod, $e$, passing through ears or bearings attached to the plate B or to the hopper, while the opposite end of said support is adjustably fastened or held in proximity to a lug, $e'$, by the thumb-screw $e^2$. At or near the center of the support E is formed a bearing for the reception of the spindle of the pinion or worm wheel F in gear, when elevated, with the worm F' or equivalent driving mechanism.

Upon the upper face of the wheel F is formed a center pin, $f$, carrying a rubber or other spring-cylinder, $f'$, and an inclosing-ring, $f^2$, provided with one or more offsets or lugs, $f^3$.

On the under side of the feed-disk C is formed a collar, $g$, adapted to enter between the spring $f'$ and ring $f^2$ on the wheel F, suitable notches or slots being formed in said collar for the reception of the lugs $f^3$.

It is obvious that as thus constructed and arranged the disk can be readily removed or replaced independent of its supporting and operating gear by simply releasing and dropping the support E. Moreover, the disk is held to its seat by an elastic pressure, which can readily be adjusted by means of the thumb-screw, so as to compensate for wear and always maintain a close joint, a very important feature in this class of machines.

The bearings for the shaft H, carrying the worm or other driving-gear and the guides for the rod $d'$, are attached to the plate B, as is also the lug $e'$, through which passes the adjusting-screw; hence all the operating parts are united and supported upon a single plate or frame, and the whole is adapted to be applied to the hopper without further fitting.

When two or more feed-disks are employed on the same or contiguous hoppers, as shown in Figs. 1 and 2, the shaft H and rod $d'$ are continued across and supported in the bearings formed on or attached to the several plates.

Having thus described my invention, what I claim as new is—

1. In a fertilizer-distributer and in combination with the hopper thereof, the detachable plate B, with its vertical flanges and inwardly-projecting conduit, and the rotating feeding-disk mounted upon a support hinged to the said detachable plate, substantially as described.

2. In combination with the plate B, its dependent flanges, and inwardly-projecting flanged conduit, the rotary feeding-disk provided with spurs or lugs, substantially as described.

3. In combination with the rotating feed-disk, the operating-gear, the intermediate clutch, and the sustaining-spring, substantially as described.

4. In combination with the feeding mechanism, the cut-off, connecting-rod, sliding bar, and inclined sector D', mounted upon the drill-elevating shaft, substantially as described.

5. In combination with the operating-gear provided with a spring and clutch and mounted upon a pivoted support, the removable feed-disk, substantially as described.

6. In combination with the plate and its dependent flange, a spring-seated feed-disk connected with its operating-gear by a clutch, substantially as described.

7. In combination with the plate, its dependent flange, and the rotary feed-disk, the operating-gear mounted in an adjustable support, said feed-disk being sustained upon an elastic cushion and united to the gear by a clutch device, substantially as described.

8. The operating-gear provided with the cushion and inclosing-flange, the latter having lugs or shoulders, as described, in combination with the feeding-disk and its notched ring, substantially as described.

9. The pivoted and adjustable support carrying the worm-wheel and feed-disk, in combination with the worm-shaft, substantially as described.

10. The bifurcated support pivoted to the plate B at one end and held by an adjusting-screw at the other, in combination with the centrally-located gear and rotary feed-disk, substantially as described.

11. In combination with the rotary feed-disk, its operating-gear, and intermediate clutch and cushion, the adjustable bifurcated arm or support pivoted to the plate B near the worm-shaft, substantially as described.

12. In combination with the plate B, cut-off, rotary feed-disk, and operating-gear therefor, the pivoted support, worm-shaft, and sliding bar, all mounted upon the plate B, substantially as described.

LEANDER BECKER.

Witnesses:
A. N. GREEN,
AMOS W. WINAND.